UNITED STATES PATENT OFFICE.

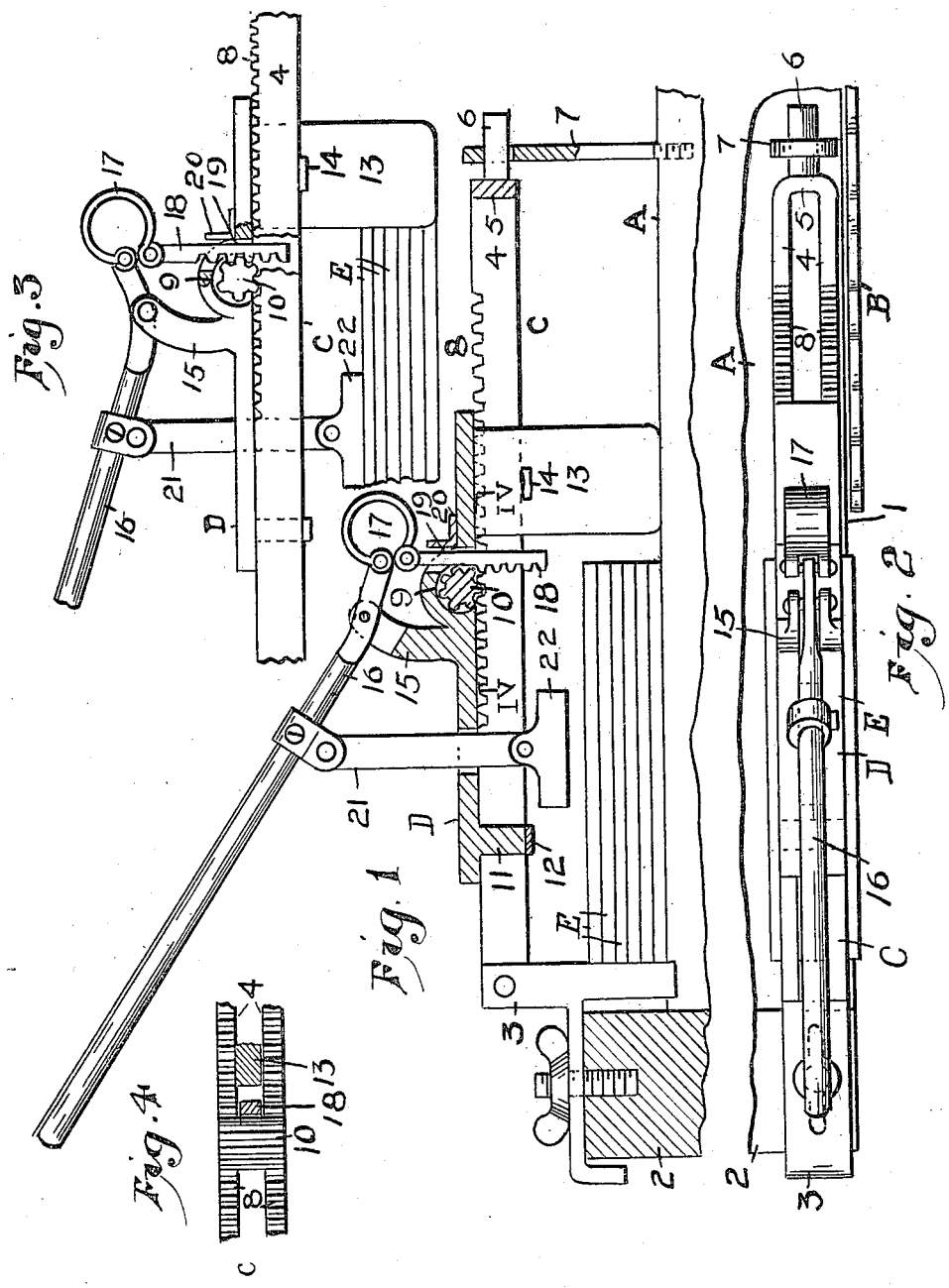

ALFRED P. HOCHSTEIN, OF PITTSBURGH, PENNSYLVANIA, ASSIGNOR OF ONE-THIRD TO GEORGE J. CAMPBELL, OF PITTSBURGH, PENNSYLVANIA.

CLAMPING MECHANISM FOR SAWING-MACHINES AND THE LIKE.

1,281,161.    Specification of Letters Patent.    Patented Oct. 8, 1918.

Application filed March 22, 1918. Serial No. 223,914.

*To all whom it may concern:*

Be it known that I, ALFRED P. HOCHSTEIN, a citizen of the United States, and residing in the city of Pittsburgh, in the county of Allegheny and State of Pennsylvania, have invented or discovered new and useful Improvements in Clamping Mechanism for Sawing-Machines and the like, of which the following is a specification.

My invention consists in a device for clamping linotype slugs or other objects of metal or wood to the bed of a sawing or cutting machine of any kind.

In the use of sawing or cutting machines in printing shops the slugs, or other objects to be cut or trimmed, are held in place on the bed of the machine by the fingers of the workman. This method of holding the slugs in place necessarily results in inaccuracy in positioning the slugs in relation to the cutting tool, and there is the ever present danger of the slugs or the operator's fingers slipping, resulting frequently in cutting or even severing the fingers.

The object I have in view is the provision of convenient means for accurately maintaining the position of the slugs in relation to the cutting tool without danger of injury to the workman's fingers.

Generally speaking, my device consists of horizontally moving means and vertically moving means for clamping the slugs, and means whereby when one of said means is disengaged from said slugs the other means is free to be moved away from or toward the slugs, but when said first named means engages with said slugs, said second mentioned means is locked rigidly in position.

In the accompanying drawings, Figure 1 is a side elevation, partially in vertical section showing my device applied to the bed of a circular saw machine and in position preliminary to clamping a pile of slugs on said bed; Fig. 2 is a plan view of the same; Fig. 3 is a side elevation showing a pile of slugs clamped on the machine bed by my device, and Fig. 4 is a horizontal section taken along the line IV—IV in Fig. 1 showing the mounting of the gear in the sliding platform.

The following is a detailed description of the drawings.

A represents the bed of a sawing or cutting machine provided with a vertical straight edge 1 against which works the cutting tool, such as the circular saw B. 2 represents a transverse rib or flange on the bed to which is secured a bracket 3 as by means of a screw bolt.

C is a frame rigidly secured to the bracket 3 and extending horizontally therefrom parallel to the straight edge 1. The frame is composed of parallel twin bars 4 whose forward ends are connected together by a cross web 5 provided with a forwardly extending lug 6 which may be inserted into the eye of a vertical standard 7 screwed into the bed A.

The top edges of the bars 4 are provided with teeth 8.

D is a platform slidingly mounted on the frame C movable along the top of the bars 4 and provided on its under face with a partially cylindrical seat 9 for a transversely positioned gear roller or broad gear wheel 10 which meshes with the teeth 8 as the platform D is slid in either direction along the bars 4. The gear 10 is held in position between the platform D and the frame C and by making the seat 9 greater than semi-cylindrical. The rear end of the platform is provided with a depending block 11 which extends down between the bars 4 and is provided with a cross bar or strap 12 which engages the lower edges of the bars 4 and retains the rear end of the platform flat on said bars. The front end of the platform is provided with a second depending block 13 extending down between the bars 4 and just clearing the top surface of the table A. 14 represents lateral brackets on said block 13 which engage the lower edges of the bars 4 and hold the front end of the platform D flat on said bars.

15 represents a standard rising from the platform D and having its upper end bifurcated to pivotally secure a lever 16 whose short end is resiliently connected, as by curved leaf spring 17, to the upper end of a bar 18 sliding vertically in a slot 19 in said platform and between the bars 4. The upper end of said bar 18 is reduced and plane to clear the teeth of the gear 10, while its lower end is widened and toothed, so that when said bar is raised, said teeth engage said gear, locking the latter against rotation and thus holding the platform C stationary. 20 is a guide bracket for the bar 18. To the longer end of the lever 16 is pivotally secured the upper end of a link 21 depending through a slot in the platform D and between the bars 4. 22 is a foot block pivotally mounted on the lower end of the link 21.

E represents a pile of slugs or other objects to be clamped properly in position in relation to the straight edge 1 so that the saw can make the proper cut in the same.

In use, the slugs are piled in the proper position, as shown in Fig. 1 with one end against the bracket 3. The lever 16 is now seized and the block 13 is moved toward the left in said figure until it abuts up against the ends of the slugs E, clamping the same between the block 13 and the bracket 3. The long end of said lever 16 is now depressed, thus forcing the foot block 22 down snugly on the pile of slugs and raising the bar 18 so that its toothed portion engages the gear 10 and locks the platform stationary, thus preventing either horizontal or vertical movement of the pile during the sawing or cutting operation. When the slugs have been properly cut, the long end of the lever 16 is raised, thus removing the pressure of the foot block 22 on the top of the slugs, while the raising of the long end of the lever depresses the bar 18 so that its teeth move out of engagement with the gear 10, thus permitting the frame D to be slid aside so that the block 13 is out of engagement with the ends of the slugs E.

The resilient connection between the lever 16 and the bar 18, the leaf spring 17 prevents bending or breaking of the parts should the bar 18 catch and refuse to move readily.

It is evident that my improved invention provides convenient means for positioning and clamping objects on a cutting machine, which means are inexpensive but strong in structure and may be operated in a moment, either in adjusting the objects to be cut or in releasing the same after the cutting operation.

What I desire to claim is:—

1. A device for securing work in position on the bed of a cutting machine, comprising a pair of clamping members moving in intersecting planes, and means whereby when one of said members is pressed into engagement with the work the second member is locked stationary, for the purpose described.

2. A device for securing work in position on the bed of a cutting machine, comprising a pair of clamping members moving in intersecting planes, and means whereby when one of said members is pressed into engagement with the work the second member is locked stationary but when the first member is released from engagement with said work said second member may be moved, for the purpose described.

3. A device for securing work in position on the bed of a cutting machine, comprising a frame, a member movable in a horizontal plane and adapted to engage the end of said work to hold it against a fixed support, a second member adapted to press the work against the bed, and means whereby when said second member is pressed against the work said first member is locked stationary, for the purpose described.

4. A device for securing work in position on the bed of a cutting machine, comprising a frame mounted on said machine, a platform sliding on said frame, a member mounted on said platform and adapted to engage the end of the work, a lever pivotally mounted on said platform, a second member pivotally mounted on said lever and adapted to be pressed down on said work, and means whereby when said second member is pressed down on said work said first member is locked stationary, for the purpose described.

5. A device for securing the work in position on the bed of a cutting machine comprising a frame mounted on said machine, a platform slidably mounted on said frame, a member mounted on said platform and adapted to engage the end of said work, a second member adapted to be pressed down on said work, and combined means for pressing said second member down on said work and locking said first member stationary, for the purpose described.

6. A device for securing work in position on the bed of a cutting machine, comprising a frame mounted on said machine and provided with a rack, a clamping member slidingly mounted on said frame and adapted to engage the work, a gear carried by said member and meshing with said rack, and means for locking said gear whereby the member is held stationary on the frame, for the purpose described.

7. A device for securing work in position on the bed of a cutting machine, comprising a frame mounted on said machine and provided with a rack, a clamping member slidingly mounted on said rack and adapted to engage the work, a gear carried by said member and meshing with said rack, manually operated means adapted to engage said gear and lock the same whereby the member is held stationary on the frame, and means whereby said locking means is automatically thrown into its inoperative position when released, for the purpose described.

Signed at Pittsburgh, Pa., this 19th day of March, 1918.

ALFRED P. HOCHSTEIN.

Copies of this patent may be obtained for five cents each, by addressing the "Commissioner of Patents, Washington, D. C."